(12) United States Patent
Müller

(10) Patent No.: US 6,904,872 B2
(45) Date of Patent: Jun. 14, 2005

(54) RETRACTABLE LEASH FOR ANIMALS

(75) Inventor: Roland Müller, Gersheim (DE)

(73) Assignee: Geniflex Inc., Great Falls, VA (US)

( * ) Notice: Subject to any disclaimer, the term of this patent is extended or adjusted under 35 U.S.C. 154(b) by 0 days.

(21) Appl. No.: 10/859,692

(22) Filed: Jun. 3, 2004

(65) Prior Publication Data

US 2004/0237907 A1 Dec. 2, 2004

Related U.S. Application Data

(63) Continuation of application No. 10/275,447, filed as application No. PCT/DE01/01662 on May 3, 2001, now abandoned.

(30) Foreign Application Priority Data

May 5, 2000 (DE) .................................... 200 08 014 U

(51) Int. Cl.⁷ .......................... A01K 27/00; B65H 75/34
(52) U.S. Cl. ..................... 119/796; 119/797; 119/789; 242/371
(58) Field of Search ................................. 119/796, 769, 119/789, 788, 792, 794, 795, 797; 242/371

(56) References Cited

U.S. PATENT DOCUMENTS

| | | | | |
|---|---|---|---|---|
| 59,660 A | * | 11/1866 | Rodgers | 242/371 |
| 1,015,459 A | * | 1/1912 | Riggle | 242/371 |
| 2,110,433 A | * | 3/1938 | Yost | 379/325 |
| 2,878,981 A | * | 3/1959 | Guifo | 441/80 |
| 2,919,676 A | * | 1/1960 | Schneider | 119/796 |
| 3,439,428 A | * | 4/1969 | Zelnick | 33/701 |
| 3,578,260 A | * | 5/1971 | Kell | 242/384.2 |
| 3,635,419 A | * | 1/1972 | Pringle | 242/382.3 |
| 3,693,596 A | | 9/1972 | Croce et al. | |
| 3,784,125 A | * | 1/1974 | Law et al. | 242/387 |
| 3,853,283 A | * | 12/1974 | Croce et al. | 242/381.6 |
| 3,937,418 A | * | 2/1976 | Critelli | 242/384.7 |
| 4,081,152 A | * | 3/1978 | Henderson | 242/371 |
| 4,106,721 A | * | 8/1978 | Ulrich | 242/371 |
| 4,165,713 A | * | 8/1979 | Brawner et al. | 119/794 |
| 4,501,230 A | * | 2/1985 | Talo | 119/796 |
| 4,869,439 A | * | 9/1989 | Sato et al. | 242/371 |
| 5,377,626 A | * | 1/1995 | Kilsby et al. | 119/796 |
| 5,490,805 A | * | 2/1996 | Bredesen | 441/75 |
| 5,595,143 A | * | 1/1997 | Alberti | 119/794 |
| 6,179,104 B1 | * | 1/2001 | Steinmuller et al. | 191/12.2 R |
| 6,213,421 B1 | * | 4/2001 | Franklin | 242/384.7 |
| 6,243,921 B1 | * | 6/2001 | Chang | 24/3.13 |
| 6,364,237 B1 | * | 4/2002 | Kagel | 242/379 |
| 6,416,009 B1 | * | 7/2002 | Iaciofano et al. | 242/384.7 |
| 6,425,541 B1 | * | 7/2002 | Strobel | 242/371 |
| 6,474,270 B1 | * | 11/2002 | Imes | 119/796 |
| 6,523,500 B1 | * | 2/2003 | Zenteno | 119/796 |
| 6,526,918 B1 | * | 3/2003 | Arnold | 119/796 |
| 2004/0154557 A1 | * | 8/2004 | Meissner | 119/796 |
| 2004/0237906 A1 | * | 12/2004 | Waxman et al. | 119/796 |

FOREIGN PATENT DOCUMENTS

| | | | | |
|---|---|---|---|---|
| DE | 8509585 | * | 9/1986 | ........... B65H/75/34 |
| DE | 85 09 585.0 | | 9/1986 | |
| DE | 298 16 372 U | | 4/1999 | |
| DE | 200 08 014 U | | 9/2000 | |

* cited by examiner

Primary Examiner—Teri Pham Luu
Assistant Examiner—Elizabeth Shaw
(74) Attorney, Agent, or Firm—Ursula B. Day; Henry M. Feiereisen

(57) ABSTRACT

The invention relates to a retractable leash for animals, having a housing containing a spring-biased reel in which the remaining length of leash can be taken up and which is stoppable by an actuating mechanism for adjustment of the maximum extension length of the leash as required, and by providing for the slack section of the leash to be taken up automatically by the reel when this maximum extension length is not being used, thus ensuring that the leash is always taut without restricting the animal's freedom of movement unnecessarily.

20 Claims, 6 Drawing Sheets

RETRACTABLE LEASH FOR ANIMALS

This application is a continuation of Ser. No. 10/275,447 Nov. 4, 2002 now abandoned, which is a 371 of PCT/DE 01/01662 filed May 3, 2001.

BACKGROUND OF THE INVENTION

This invention relates to a retractable leash for animals, having a housing containing a spring-biased reel in which the remaining length of leash can be taken up and which is stoppable by means of an actuating mechanism.

Compared to conventional leashes, retractable leashes have the advantage that they automatically wind up excess leash on a spring-biased reel. If desired, the length to which the leash can extend can be set temporarily by actuating a key. By actuating another push-to-lock key, the length to which the leash extends can be set permanently. The advantage of setting a permanent leash length is that the leash will be halted at the set length without a key having to be actuated. The disadvantage, however, is that the leash no longer winds up automatically. If the length to which the leash is extended falls short of the length set, the leash will drag on the ground and may get dirty. Moreover, the animal or the person in charge of it can get their legs caught up in the leash, or, since a leash dragging on the ground may be difficult to detect, passers-by may trip over it.

The DE 85 09 585 U1 describes a device which seeks to overcome the disadvantages described above. In this publication, the basic problem was recognized and an initial approach to solving it is described. With this device, the extension length of the leash can be additionally limited to one particular length predetermined by the design. For example, as is described in this publication, the extension can be limited to about half the leash length. This limitation, however, is dependent on the wind-up diameter of the spring-biased winding reel, which means that the accuracy of the limitation is determined by the number of layers of leash on the reel. Depending on the kind of leash cord, one layer corresponds to about one meter of unrolled leash. If the leash does not roll up on the reel in strictly parallel windings, but in superposed windings, the length of leash that can be extended can vary by one to two meters. The device is designed in such manner that the pawl described in the publication engages when the given length of leash has been released, thus halting any further release. However, on account of the hysteresis (difference between engaging and disengaging) inherent in the design, the leash must roll up by at least two layers, i.e. it must retract by about two meters, before the pawl disengages again and falls back into its initial position.

All in all, the described device has three major disadvantages. Firstly, only one intermediate leash length can be activated, which makes handling very inconvenient; after all, it's a serious disadvantage if a leash measuring, say, 7 m in length, can only be set to a single intermediate length. Secondly, even this set length is subject to unpredictable and strong variation depending on the way the leash winds up on the reel. This is something the person in charge cannot influence. Accordingly, he or she cannot rely on the leash's always blocking after the same length of leash has been released. Particularly in town, this can lead to an incalculable risk. The third disadvantage is that the leash must retract (roll up) by a considerable amount in order for the locking mechanism to disengage and allow the leash to be released anew and stopped again when necessary. In practice, this is contrary to the intended purpose of a retractable leash, which is to allow the animal as much freedom of movement as possible, and not to have to train it to behave in a certain way before it can be taken for a walk on this kind of leash.

Sometimes an animal will bite through its leash close to its point of attachment. The leash will then retract at very high speed, with a danger of its loosely-jerking free end injuring anyone nearby. At any rate, the leash will wind completely onto the spring-biased reel and will no longer be accessible from outside the housing.

To restore the leash to working order, the entire housing has to be opened up. The reel's spring has to be tensioned again, and the housing then reassembled part by part.

If the leash is not preset with a key, animals will often bound away too quickly for the person in charge to stop them. They may cover several meters—for example to chase after another animal—before they are stopped. This can lead to unpredictable, dangerous situations. The abruptness with which an animal is stopped in such a situation, moreover, poses the risk of neck injuries to the animal, with potentially serious consequences.

The object of this invention is thus to create a retractable leash that does not have these disadvantages.

SUMMARY OF THE INVENTION

This object is established according to the invention by means of a device for adjusting the maximum extension length of the leash as required, and by providing for the slack section of the leash to be taken up automatically by the reel when this maximum extension length is not being used.

This ensures that the leash is always taut without restricting the animal's freedom of movement unnecessarily.

A further development of the invention consists in the provision of means with which further retraction of the leash is preventable once a certain retraction speed is reached. Alternatively, means can be provided with which further retraction of the leash is preventable once the leash tension falls short of a predefined value.

It is expedient to provide means with which further retraction of the leash is preventable once a predefined retraction acceleration is reached.

It is furthermore within the scope of the invention to provide means for indicating the amount by which the leash can still extend before the set maximum length is reached.

It is also beneficial to provide means which prevent a sudden, jerk-like increase in the external pulling force when the leash is halted automatically.

BRIEF DESCRIPTION OF THE DRAWING

Embodiments of the invention will now be described by referring to the drawings.

DETAILED DESCRIPTION OF PREFERRED EMBODIMENTS

Figure 1:
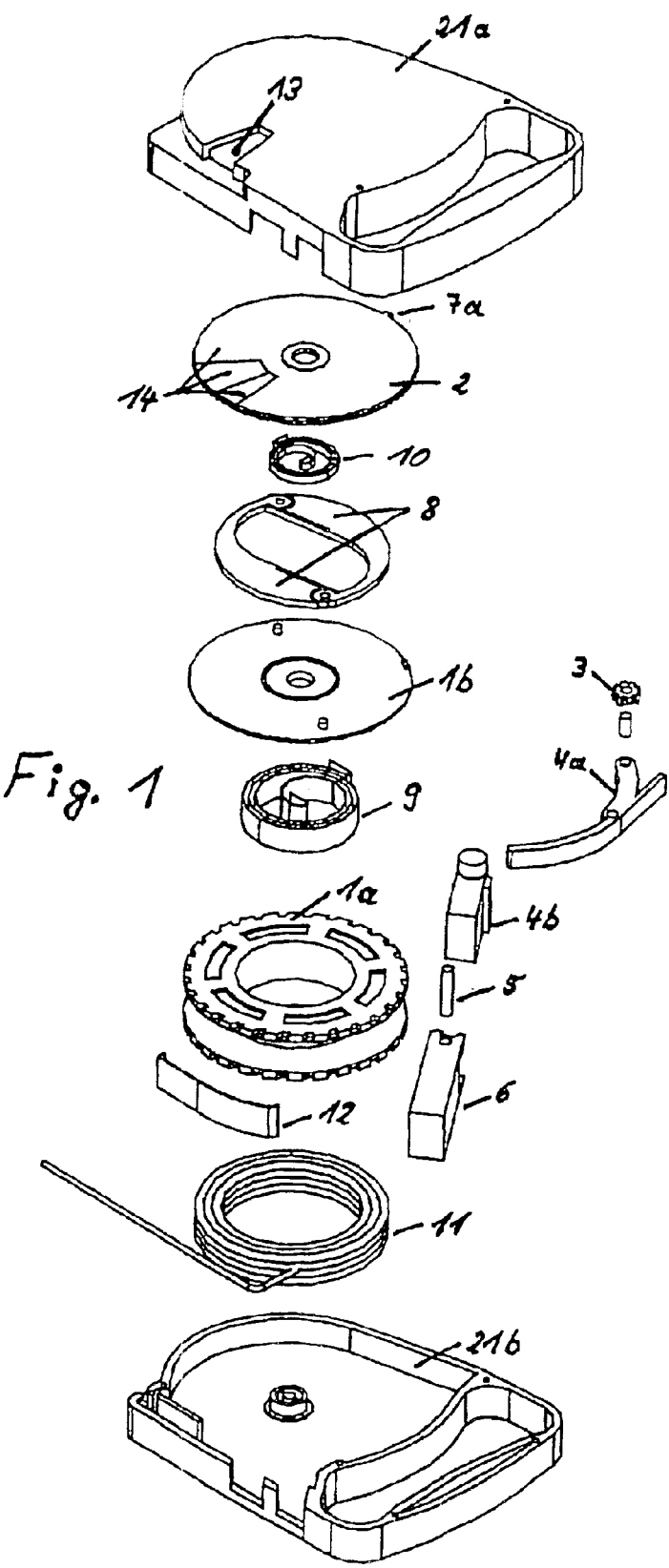
FIG. 1 and FIG. 2 are exploded views of a retractable leash assembly according to the invention.
Figure 2:
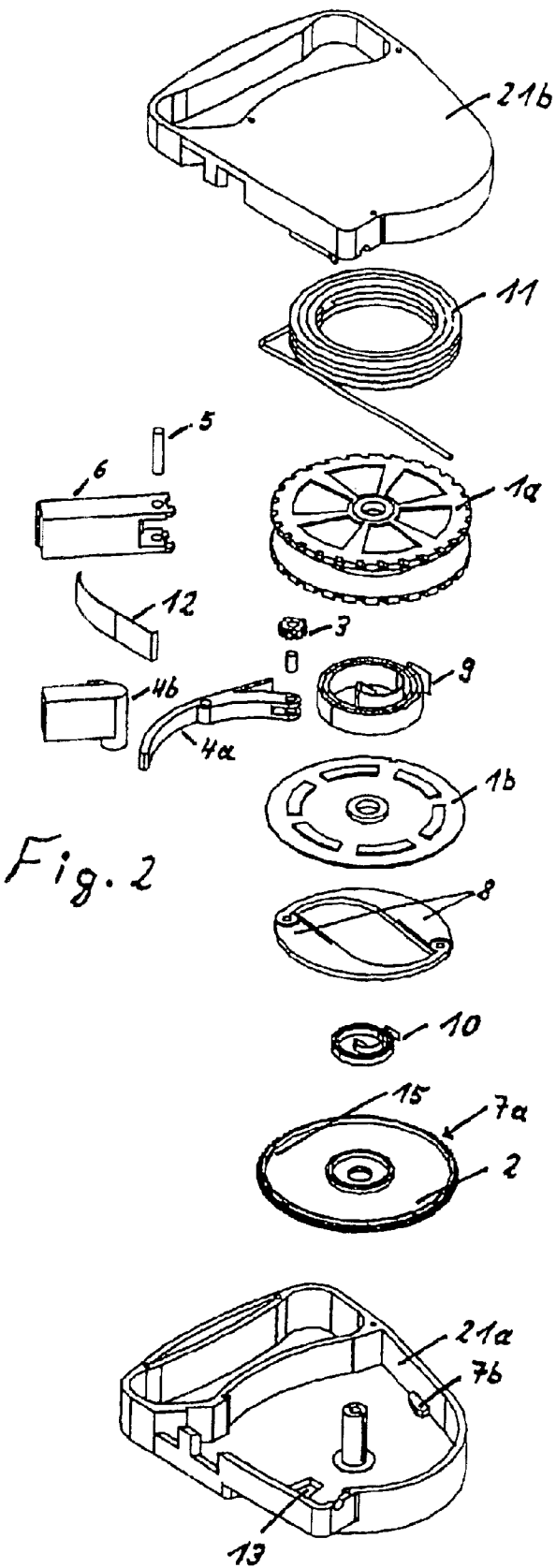
Figure 3:
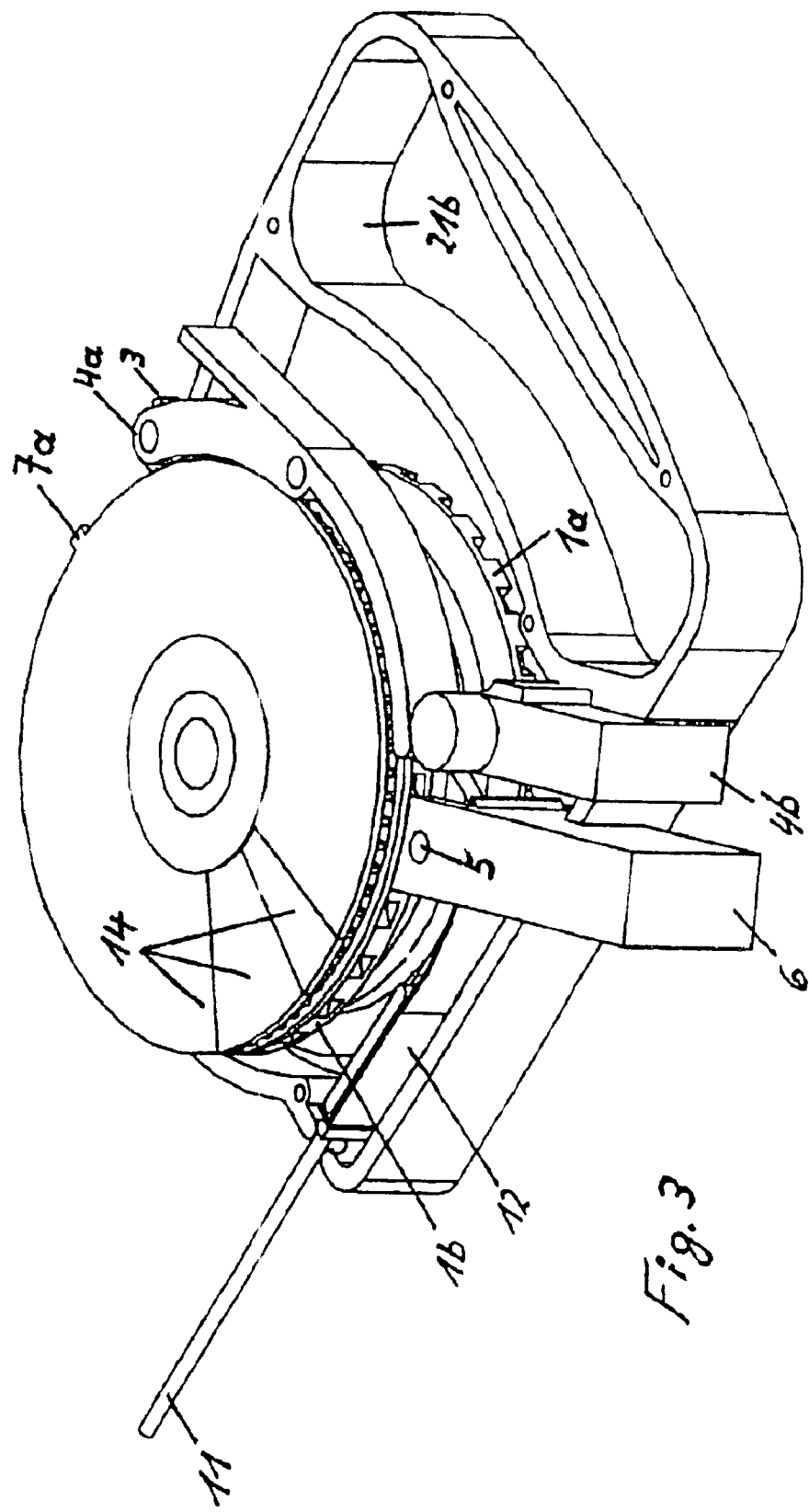
FIG. 3 and FIG. 4 show the same leash assembly with the housing opened.
Figure 4:
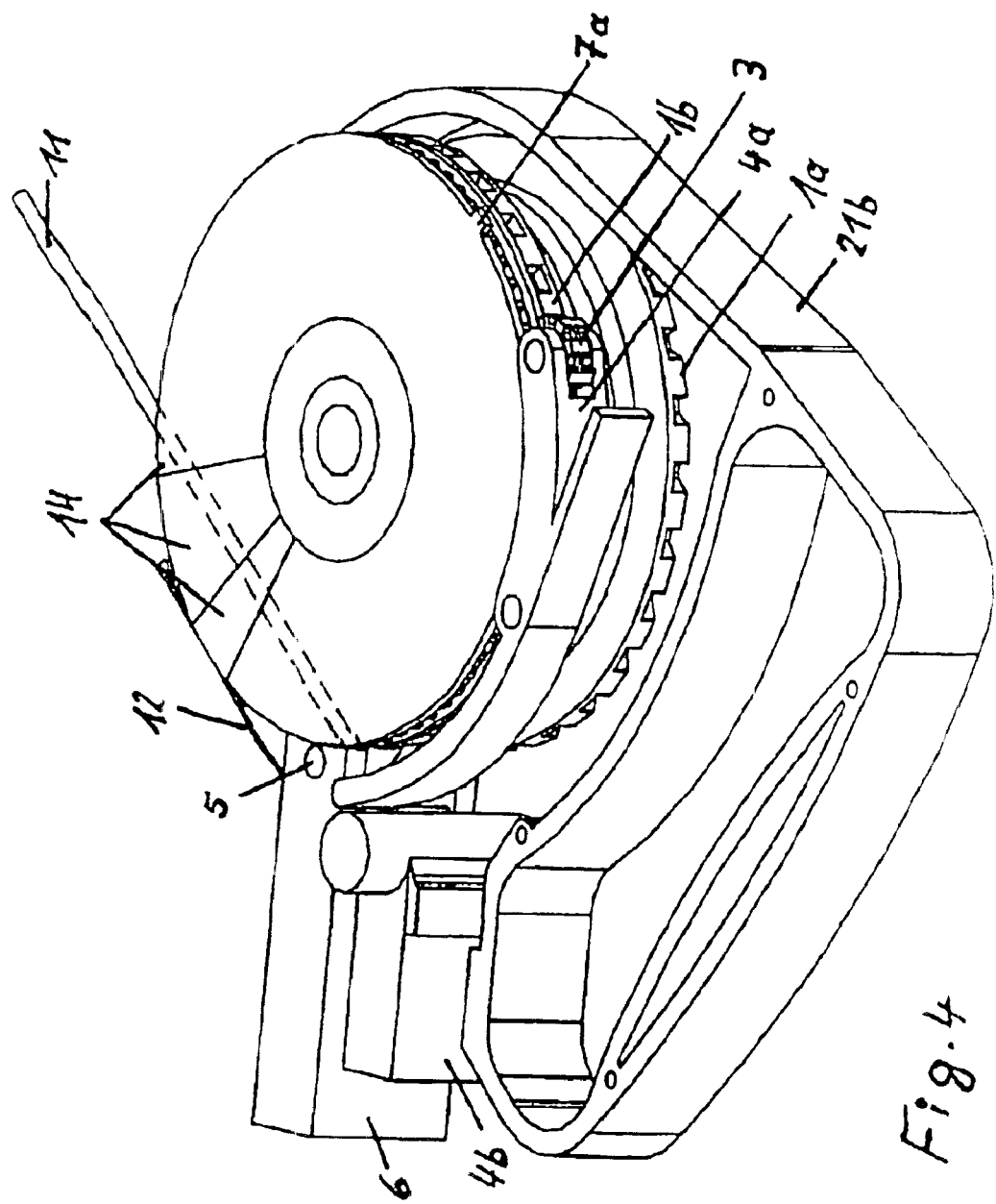
Figure 5:
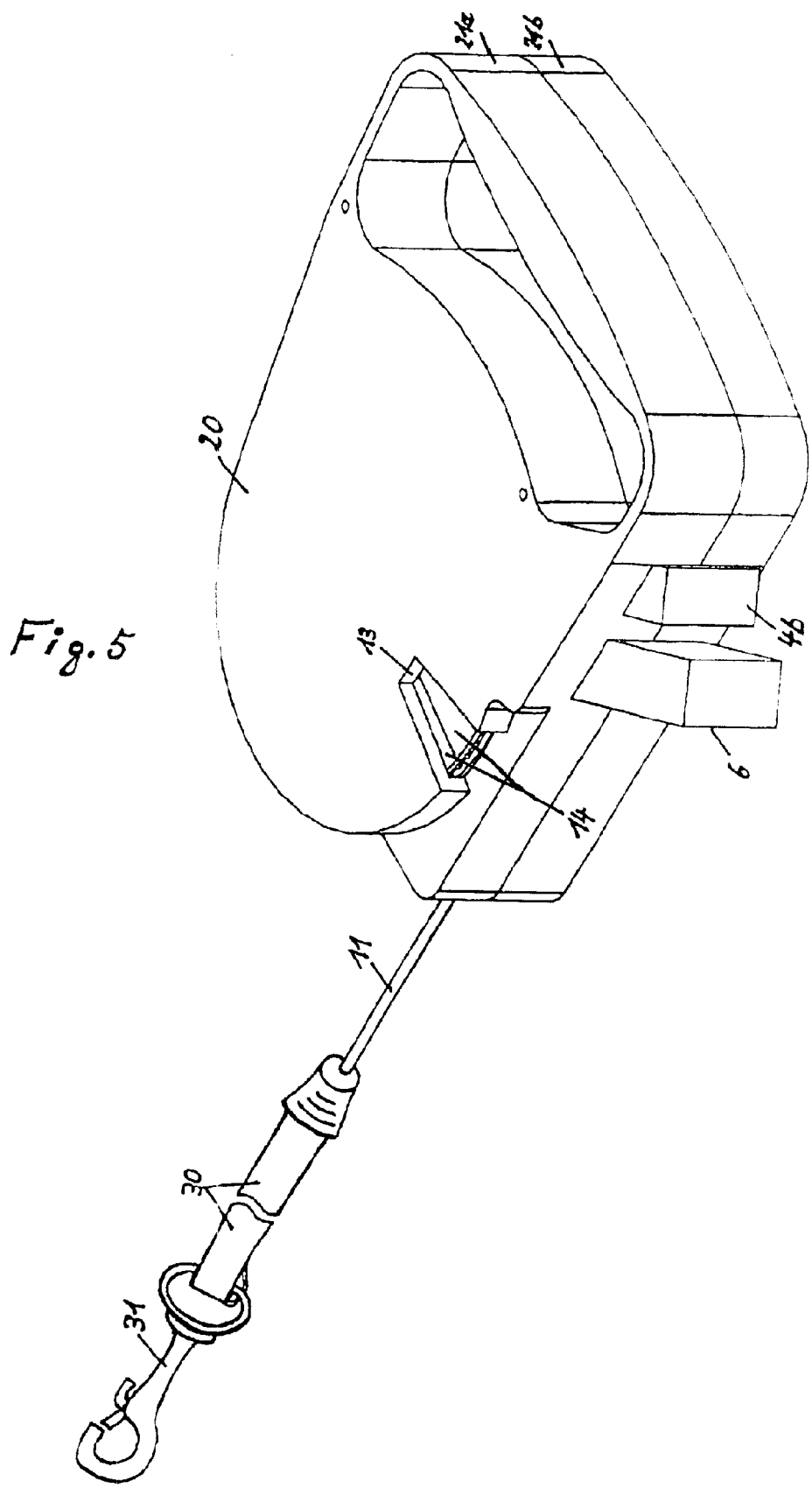
FIG. 5 shows the same leash assembly with the housing closed.

The device of the invention is preferably contained in a housing (21a, 21b) with a handle, from which housing the end of the retractable leash (11) projects, said end being provided with a toughened, chewable strap (30) and an attachment clip (31). The leash (11) is wound up on a reel (1a,b) inside the housing (21a, 21b).

As is evident from the drawings, a gearwheel (2) is mounted parallel to the reel (1a,b) onto which the leash (11) is wound. The gearwheel (2) has approximately the same diameter as the reel (1,b), with which it is releasably connected in a certain transmission ratio via another gearwheel (3). The connection is released by means of pressure on a lever (4a,b). As soon as pressure on the lever (4a,b) causes the gearwheel (3) connected therewith to disconnect the reel (1a,b) from the gearwheel (2), the gearwheel (2) is restored by means of a spring (10) to a position defined by a limit stop (7a,b). If, with the gearwheel (2) in this position, the lever (4a,b) is released again in order to reestablish the connection between the gearwheel (2) and the reel, the leash (11) cannot be pulled out further because the gearwheel (2) is located at its limit stop (7a,b), thus increasing the external pulling or extension force in the leash (11). This in turn causes more force to be exerted on the deflector roll (5) of the stop key (6), so that the latter is urged towards the centre of the reel (1a,b). If the external pulling force is great enough, the stop key (6) will connect firmly with the reel (1a,b) and prevent any further extension of the leash (11).

If the pulling force lessens, the connection between the stop key (6) and the reel (1a,b) is released, and the leash (11) is wound up by the reel (1a,b). In this case, the gearwheel (2) moves away from its limit stop (7a,b) and thus does not influence further functioning of the retractable leash assembly (20). Not until the leash (11) is extended again and causes the gearwheel (2) to reach its limit stop (7a,b) will the leash (11) be halted again. In this way, it is ensured that even when just a small length of slack in the leash (11) is retracted (wound up), and the leash is then extended again, it will be stopped exactly at the previously set position.

To prevent the leash (11) from being wound up completely by means of the spring-biased reel (1a,b)—in which case it would disappear into the housing and no longer be accessible—if an animal bites through the leash (11) or if the leash breaks as a result of a weak point, it is suggested according to the invention that when the retraction speed of the leash (11) reaches a certain maximum, further retraction is halted. This is effected by means of centrifugal masses (8) that work in opposition to spring force. As the speed at which the leash retracts increases, the diameter of the centrifugal masses (8) also increases, such that the freely movable part of the centrifugal masses (8) finally connects with the inside stop-motion means (15) of the gearwheel (2) and thus prevents any further retraction of the leash (11). If the leash (11) is now pulled out again, the centrifugal masses (8) disconnect from the gearwheel (2), and the retractable leash assembly (20) can operate again in the normal way.

Figure 6:
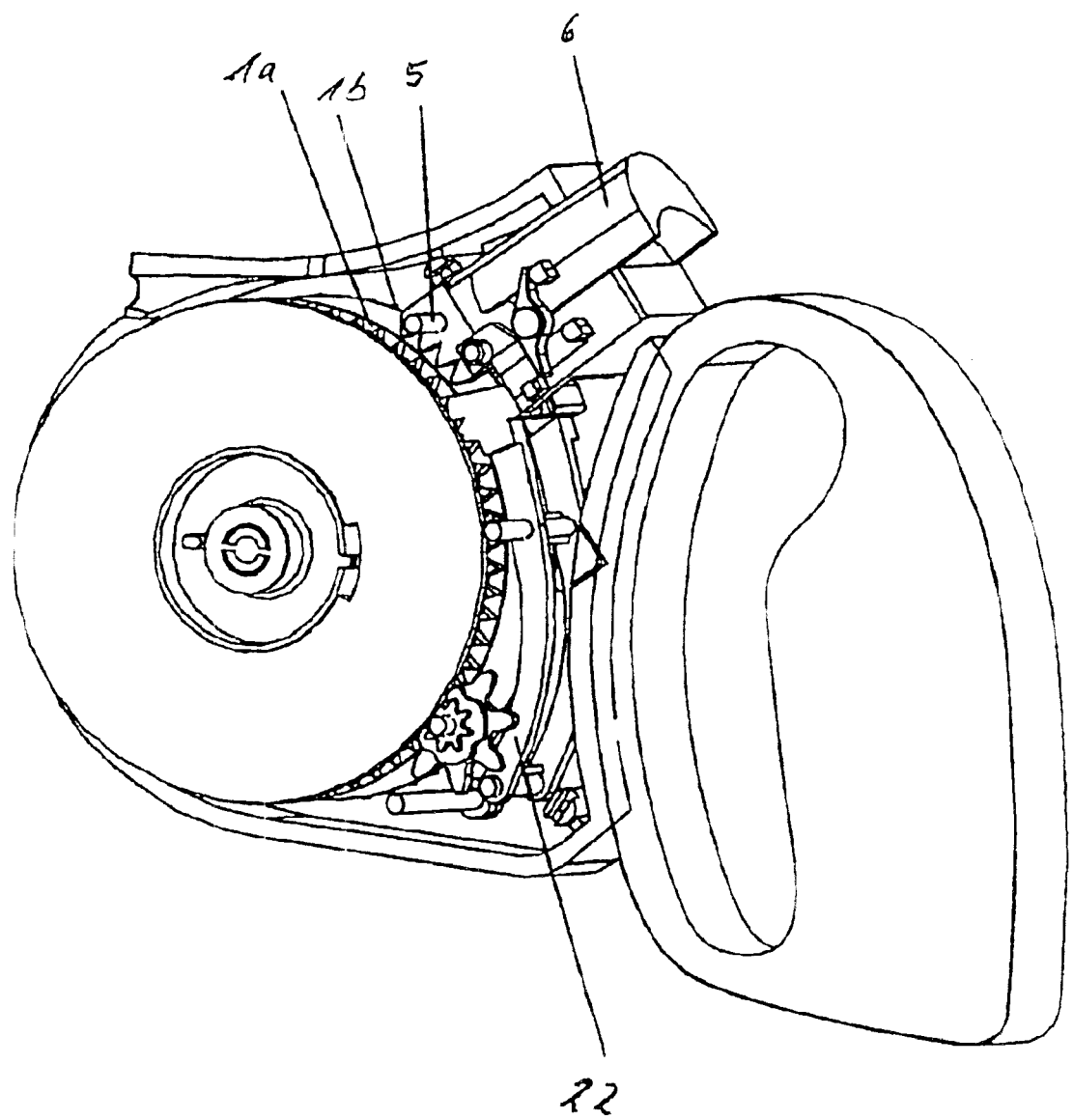
FIG. 6 shows a further development of the opened leash housing, with an alternative, tension-based brake.

An alternative suggestion consists in a device of the kind shown in FIG. 6, which prevents further retraction of the leash (11) when the tension in the leash falls short of a predetermined value. This is effected by having the leash (11) pass over the underside of a centrally mounted deflector lever (22) which is spring-biased in opposing direction and whose upper side engages the toothing of the reel (1a,b). If the leash (11) is pulled out again, the tension that develops in the leash opposes the spring bias of the deflector lever (22). As a result, the deflector lever disengages from the reel (1a,b), and the retractable leash assembly (20) can operate again in the normal way.

As a further alternative, the spring-biased stop key (6) can itself halt the reel (1a,b) and thus prevent further retraction of the leash (11), which passes over the deflector roll (5) of the stop key (6), when the tension in the leash falls short of a predetermined value. This is effected in that the stop key (6) moves away from the centre of the reel (1a,b), as a result of which a portion of the stop key (6) engages the reel (1a,b) from the inside.

To prevent an animal jerking away from the person in charge, the invention provides for a device which actuates the stop key (6) and thus prevents further release of the leash (11) when the extension acceleration of the leash (11) reaches a predefined maximum. This is effected in that, at a certain rotational acceleration of the reel (1a,b) biased by means of a spring (9), the external pulling force in the leash (11), which is reoriented via over the deflector roll (5) in the stop key (6), becomes greater than the force in the restraining spring (12) of the stop key (6). As a consequence, the stop key (6) connects with the reel (1a,b) and thus prevents the leash (11) from being extended further. If the distance between the animal and the person in charge lessens, the external pulling force in the leash (11) decreases and the restraining spring (12) pulls the stop key (6) back to its initial position, thus disconnecting the stop key (6) and the reel (1a,b). The retractable leash assembly (20) can then operate again in the normal way.

To prevent a sudden, jerk-like increase in the external pulling force when the preset leash length is reached and the leash (11) is halted automatically by the device of the invention, as a result of which the animal's health can be impaired by injuries to the neck region, the chewable strap (30) that connects the windable section of the leash (11) with the attachment clip (31) on the animal's collar, is made of a material which remains elastic until it reaches a predetermined final length. This solution is not only beneficial but also economical, since most commercially available retractable leashes already have a chewable strap (30) and this would simply need to be made of a different material which, at least initially, has elastic properties.

The amount of leash (11) that can still be released is indicated according to the invention by providing a window (13) in the housing section (21a), through which part of the gearwheel (2) is visible. The outer side of the gearwheel (2) is divided up into defined colored zones (14). The zoning can, for example, be in the form of a "red-yellow-green" sequence, with the red zone corresponding approximately to the size of the window.

When the lever (4a,b) is pressed, the gearwheel (2) rotates until it reaches its limit stop (7a,b). In this position the entire red zone is visible. After the lever (4a,b) has be released, the leash (11) is free to extend to the predefined maximum length. When the entire red zone is visible, the leash (11) has been extended to this maximum. If the distance between the animal and the person in charge lessens, the window will first show "red-yellow", followed by "yellow", "yellow-green" and finally "green". The different color zones can correspond to certain extension lengths. For example, red can correspond to an extension length of 0.5 m, yellow to an extension length of 1 m, and green to the remaining leash length. It is thus easy for the person in charge to see when the leash (11) has been extended to its temporarily set maximum length, or how much further away the animal can still go before the retractable leash assembly (20) will stop it.

What is claimed is:

1. A retractable leash for animals, comprising a housing containing a spring-biased reel for taking up a remaining length of the leash; an actuating mechanism for arresting and releasing the spring-biased reel; a control mechanism for selectively adjusting a desired maximum extension of the leash; wherein after the desired maximum extension has been set, any slack in the leash up to the maximum extension can be taken up automatically by the reel, while still allowing unwinding of the leash to the desired maximum extension.

2. The device of claim 1, wherein means are provided with which further retraction of the leash is prevented once a certain retraction speed is reached.

3. The device of claim 1, wherein means are provided with which further retraction is prevented once the tension in the leash falls short of a predefined value.

4. The device of claim 1, wherein means are provided with which further retraction of the leash is prevented once a predefined retraction acceleration is reached.

5. The device of claim 1, wherein means are provided for indicating the amount by which the leash can still extend before the set maximum length is reached.

6. The device of claim 1, wherein a means is provided with which a sudden, jerk-like increase in the external pulling force in the leash is prevented.

7. A retractable leash for animals, comprising a housing containing a spring-biased reel for taking up a remaining length of the leash and which is stoppable by means of an actuating mechanism, wherein a maximum extension length of the leash can be adjusted as required by means of a device to an adjusted extension length, and when the adjusted extension length is not used, the slack section of the leash can be taken up or extended automatically by the reel within the adjusted extension length, wherein means are provided with which further retraction of the leash is preventable once a certain retraction speed is reached.

8. The device of claim 7, wherein means are provided with which further retraction is prevented once the tension in the leash falls short of a predefined value.

9. The device of claim 7, wherein means are provided with which further retraction of the leash is prevented once a predefined retraction acceleration is reached.

10. The device of claim 7, wherein means are provided for indicating the amount by which the leash can still extend before the set maximum length is reached.

11. The device of claim 7, wherein a means is provided with which a sudden, jerk-like increase in the external pulling force in the leash is preventable.

12. A retractable leash for animals, comprising a housing containing a spring-biased reel for taking up a remaining length of the leash and which is stoppable by means of an actuating mechanism, wherein a maximum extension length of the leash can be adjusted as required by means of a device to an adjusted extension length, and when the adjusted extension length is not used, the slack section of the leash can be taken up or extended automatically by the reel within the adjusted extension length, wherein means are provided with which further retraction is preventable once the tension in the leash falls short of a predefined value.

13. The device of claim 12, wherein means are provided with which further retraction of the leash is prevented once a certain retraction speed is reached.

14. The device of claim 12, wherein means are provided with which further retraction of the leash is prevented once a predefined retraction acceleration is reached.

15. The device of claim 12, wherein means are provided for indicating the amount by which the leash can still extend before the set maximum length is reached.

16. The device of claim 12, wherein a means is provided with which a sudden, jerk-like increase in the external pulling force in the leash is preventable.

17. A retractable leash for animals, comprising a housing containing a spring-biased reel for taking up a remaining length of the leash and which is stoppable by means of an actuating mechanism, wherein a maximum extension length of the leash can be adjusted as required by means of a device to an adjusted extension length, and when the adjusted extension length is not used, the slack section of the leash can be taken up or extended automatically by the reel within the adjusted extension length, wherein means are provided for indicating the amount by which the leash can still extend before the set maximum length is reached.

18. The device of claim 17, wherein a means is provided with which a sudden, jerk-like increase in the external pulling force in the leash is preventable.

19. The device of claim 17, wherein means are provided with which further retraction of the leash is prevented once a certain retraction speed is reached.

20. The device of claim 17, wherein means are provided with which further retraction is prevented once the tension in the leash falls short of a predefined value.

\* \* \* \* \*